July 16, 1968  J. J. HOFMANN ET AL  3,392,493
POLISHING
Filed Nov. 5, 1964
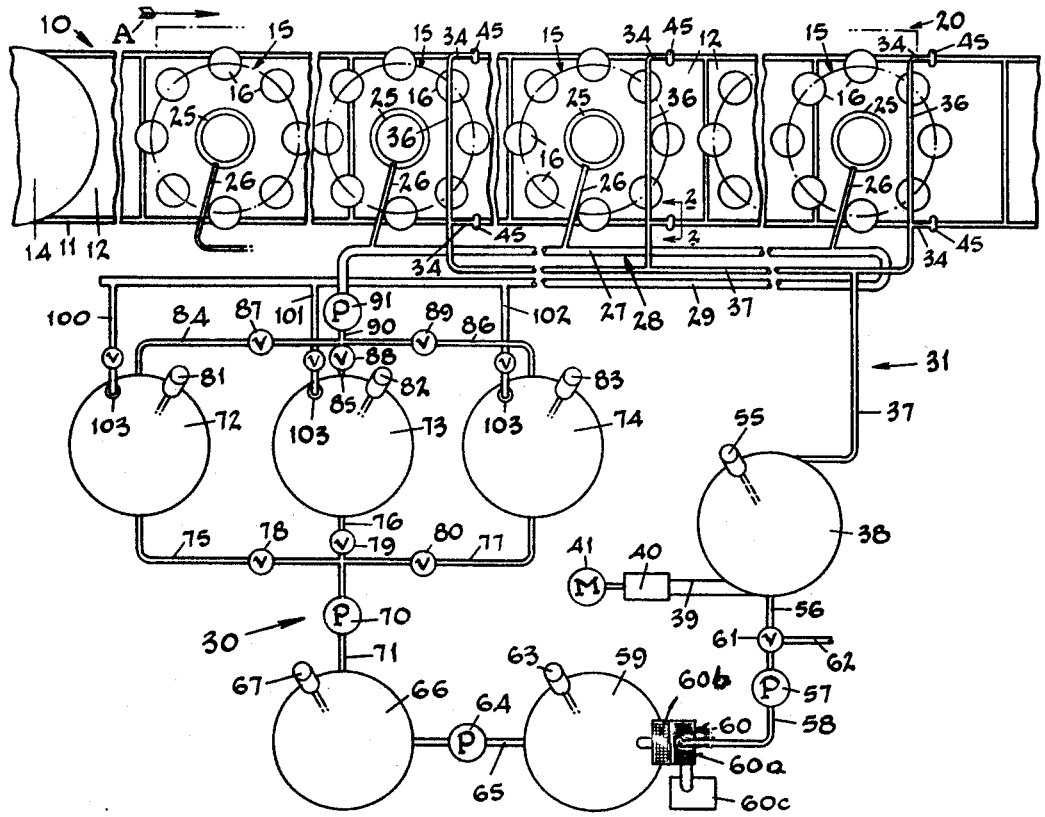
Fig. 1.
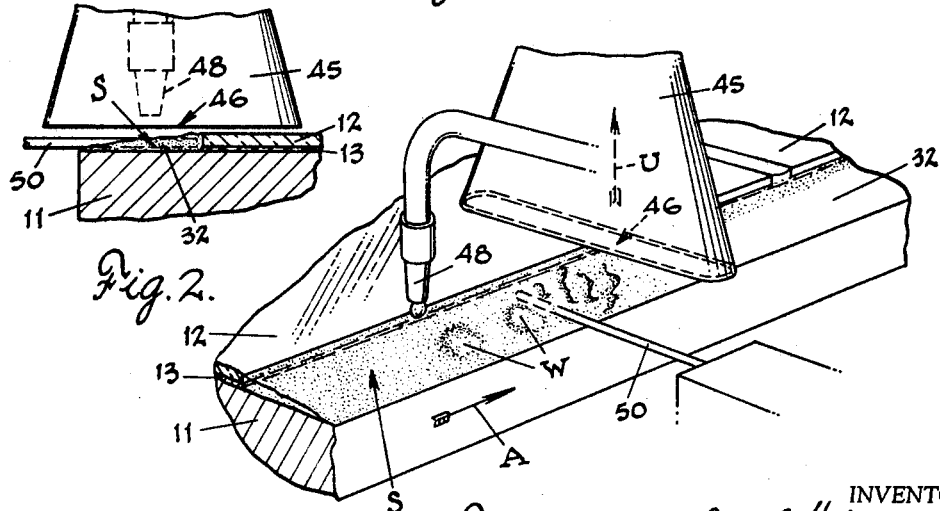
Fig. 2.
Fig. 3.
INVENTORS
John J. Hofmann and
BY James M. Dunsmore
Nobbe & Swope
ATTORNEYS

United States Patent Office 3,392,493
Patented July 16, 1968

3,392,493
POLISHING
John J. Hofmann and James M. Dunsmore, Toledo, Ohio, assignors to Libbey-Owens-Ford Glass Company, Toledo, Ohio, a corporation of Ohio
Filed Nov. 5, 1964, Ser. No. 409,206
8 Claims. (Cl. 51—110)

ABSTRACT OF THE DISCLOSURE

Polishing glass with a specified slurry including a polishing oxide, in which a part of said oxide is collected along with other materials that are rubbed from the glass surface to form a recovery slurry, conditioning the recovery slurry by adding thereto whatever essential ingredients of the specified slurry have been used up during the polishing operation in an amount necessary to make said recovery slurry of substantially the same composition as the specified slurry, and then feeding back the resulting conditioned slurry to the polishing line.

---

The present invention relates broadly to the surfacing of glass and more particularly to the polishing of previously ground plate glass blanks while moving along a continuous polishing line. Specifically, the invention has to do with the recovering of polishing oxides used in such a polishing operation and with the recirculation and reuse of the recovered materials in the same operation.

As is well known, plate glass is widely produced commercially by first rough forming a more or less continuous ribbon from a mass of molten glass then surfacing one or both sides thereof while the glass, either as a ribbon or as individual blanks that have been cut therefrom, is moved continuously along a predetermined path. During such surfacing the glass is passed first through a grinding area and then through a polishing area. In the grinding area, at least one surface is subjected to the abrasive action of sand of progressively decreasing coarseness under heavy iron runners; and in the polishing area the previously ground surface or surfaces are polished with rouge under relatively soft pads of hair felt.

This polishing with rouge (iron oxide), in a water slurry and with copperas added, has been practiced in the plate glass industry for a great many years and, until very recently, it has remained the conventional and most generally accepted method although various other polishing materials and mixtures have been suggested and tried from time to time in an effort to obtain faster and/or better controlled polishing.

For example cerium oxide, which is well known as a polishing agent in the optical glass industry, has received considerable attention but did not initially appear applicable to the commercial polishing of plate glass because of its relatively high cost, the dull surface effect it sometimes left on the finished glass and its relatively low polishing rate.

Recently, however it has been found that, by the use of a suitable additive, a polishing composition can be formulated, with cerium oxide as a principal ingredient, that gives notably improved results in the final finishing of plate glass. Such a composition can be used to provide the sole polishing oxide on a plate glass polishing line; or as a wet polishing medium at the end of a line which also employs rouge.

In any event, and whatever the polishing oxide or oxides used, continuous polishing as it is commercially practiced today is a somewhat wasteful procedure for the reason that the polishing oxide is fed to the polishing tools or runners in a water slurry and, in rubbing the slurry over the glass, the runners also throw and rub a considerable amount of the polishing oxide off of the glass. Part of this falls or drains into the sewer or sump and, where the glass is supported on tables, part is deposited on the margins of these tables beyond the edges of the glass.

In large commercial production even the loss of rouge in this way is a considerable item of expense and with the introduction of higher priced polishing oxides, such as cerium oxide, the financial loss of course becomes greater.

Accordingly, it is an important object of the present invention to recover, treat, and reuse the polishing oxides employed in a commercial glass polishing operation.

Briefly stated, the invention contemplates recovering polishing oxides of the general character referred to above, during operation of a continuous plate glass polishing line, in a water slurry; treating this recovery slurry to remove contaminants that interfere with the polishing action of the recovered oxides, adding materials necessary to bring the recovery slurry into condition to be used as a polishing slurry; and then employing the same for the continued polishing of glass on the same line.

Therefore another object of the invention is to provide an improved method and apparatus for recovering used polishing oxides from plate glass polishing lines.

Another object is the provision of a method and apparatus for efficiently removing contaminants from the recovered material that would interfere with its operation as a glass polishing agent.

Still another object is to provide a procedure for combining used materials recovered from the plate glass polishing line with new materials into a polishing slurry containing the same essential ingredients in the same proportion as would desirably be provided if all new materials were employed to make up the polishing slurry.

Other objects and advantages of the invention will become more apparent during the course of the following description when read in connection with the accompanying drawings.

In the drawings, wherein like numerals are employed to designate like parts throughout the same:

FIG. 1 is a fragmentary diagrammatic plan view of a conventional continuous plate glass grinding and polishing line, with the reclamation and recirculating system of the invention;

FIG. 2 is a fragmentary, vertical view taken on line 2—2 of FIG. 1; and

FIG. 3 is a fragmentary perspective view of the portion of the recovery apparatus shown in FIG. 2.

Referring now more particularly to the drawings there is illustrated in FIG. 1 one well known type of continuous plate glass grinding and polishing line generally designated by the numeral 10 and made up of a plurality of tables 11 arranged in end-to-end relation to form a substantially continuous loop. In operation, plate glass blanks 12 are embedded, at the laying yard area (not shown), in a layer of plaster of Paris on the decks or upper surfaces of tables 11. From the laying yard the tables 11 are continuously moved in the direction of the arrow A to carry the glass blanks successively beneath grinding runners 14 to which sand of progressively increasing fineness is supplied, and then beneath a series of rotating polishing runners 15 each of which includes a circularly-arranged plurality of polishing tools 16 covered with cattle hair felt and mounted for independent rotary movement on their own axes.

During movement of the previously ground surfaces of the blanks 12 beneath the polishing tools 16, a "slurry" of a polishing oxide is fed between the polishing tools and the glass and is rubbed over the glass surface by the tools. However, because of the forward movement of the glass blanks and the circular movement of the tools considerable amounts of the polishing slurry are carried to the opposite edges of the blanks and is either thrown off or accumulates on the margins of the support tables 11; and this accumulation on the table margins is accelerated by the natural scraping of polishing material from the felt-covered surface of each of the outer circle of polishing tools as it repeatedly moves outwardly and then inwardly over the edges of the glass blanks.

Generally speaking, this polishing material that is thrown or rubbed off the glass or that is scraped from the tools has heretofore been a complete loss as waste which not only had to be disposed of but which necessitated the constant supplying of large amounts of new polishing oxides to the system.

According to the present invention, however, this "waste" polishing material, which is made up largely of the polishing oxide being used with minor amounts of glass and other solid byproducts of the polishing operation, is recovered by collecting it in a water slurry. The recovery slurry is then specially treated and supplemented to recondition it for re-use, whereupon it is pumped directly into the polishing oxide supply system for the line in the same manner as fresh polishing oxide would be supplied.

Thus, as pointed out above, in the prior conventional operation of a grinding and polishing line such as illustrated in the drawings, a water slurry, generally of rouge and copperas, was fed beneath the runners 15 throughout the polishing area 20. On the other hand, in more recent polishing techniques, a rouge slurry may be supplied to the runners in the forepart of the polishing area while a slurry of a different polishing oxide, such as cerium oxide with cerous nitrate or other essential additive, is fed beneath the runners in the final area of polishing.

In any event, the polishing slurry of whatever composition is conventionally fed to distributor troughs or the like 25, associated with each polishing runner, through conduits 26, with each conduit that feeds the same polishing slurry being connected to a distributor section 27.

In adapting the present invention to a polishing line of the character just described, the distributor section 27 as made part of a supply piping arrangement 28 on the output side 30 of a reclamation system, which also includes an input or return side 31.

The return side 31 of the system includes pipes 34 and 35, suitably supported above the marginal surfaces 32 of the tables 11 and connected by conduits 36 to a collector pipe 37. The pipe 37 in turn is attached to the upper end of a closed receiver tank 38 which, as shown in FIG. 1, is connected by an air exhaust duct 39 to a blower unit 40 powered by a motor 41. The unit 40 operates to reduce the pressure within the tank 38 sufficiently to produce a suitable degree of vacuum in the tank and throughout the pipes 34, 35, 36 and 37 and thus provide a vacuous condition at the intake ends of pipes 34 and 35.

In order to collect used polishing oxide through this piping arrangement the end of each pipe 34 and 35 is preferably formed with a flattened, funnel-shaped member 45 having an elongated, narrow open lower end 46 extending transversely of the path of travel of the margins of the tables 11 (FIGS. 2 and 3). The edge surface of the member 45 is spaced a sufficient distance above the table surface to avoid contact with a glass blank 12 mounted thereon but close enough to provide an effective suction through the respective pipes 34 and 35 and end 46 of the funnel-shaped members 45 that will pick up the accumulation of polishing slurry indicated by the letter S from the tables and pull it in the direction of the arrow, designated by the letter U (FIG. 3).

Because the slurry accumulation in this area may and usually does tend to thicken or become somewhat dried, it is desirable to provide a way of reducing its consistence. To this end there may be provided at each funnel member 45, a water nozzle 48, supported in any suitable manner to direct droplets of water onto the surface of the accumulation of slurry S in a spaced pattern, as indicated by the letter W, and provide sufficient moistening action to soften the accumulation and render it readily removable without creating objectionable water dripping or making the slurry so fluid that it will run downward over the sides of the tables.

To further facilitate the removal of the slurry accumulation S, a scraper can be provided that will agitate the same and free it from the tables' surfaces. This may be in the form of a relatively stiff stationary wire 50 which, as the tables move therepast, serves to mix the water-softened surface of the accumulated solids into the lower portions thereof while simultaneously acting to scrape and loosen such lower portions. Since the scraper wire although stiff is somewhat resilient, it will or can be made to vibrate to and fro to, in effect, stir the accumulated material and so more completely reduce it to a wet, loose mass in which form it is easily removed by the suction into and through the funnel ends 45 of pipes 34 and 35.

As the collected material is pulled through the pipe 37 and into the receiving tank 38 it is absorbed into and intermixed with the material already there by the action of an agitating or stirring device 55 and the tank contents are withdrawn from the lower area thereof through pipe 56 which, by way of pump 57 and pipe 58 connects to the upper end of a temporary storage tank 59 at the end of the input or return side 31 of the system and which has a screen unit 60 associated therewith and into which the pipe 58 discharges.

The pipe 56 includes a hand or otherwise controlled valve 61 which can be employed to draw fresh water through a pipe 62 and add it to the material being drawn into the pump 57 to control the fluidity of the recovery slurry and, when desired, to provide water for flushing this portion of the system.

The screen unit 60 preferably contains a two level screen with the top screen 60a being rather coarse (between about 70 and 90 mesh) and serving as a scalping screen while the bottom one 60b is much finer (between about 120 to 200 mesh). The purpose of the screen is of course to remove impurities and unwanted solids and especially hair from the felt polishers. The provision of the two level screen not only does an effective cleaning job, removing even the smallest particles of hair, but it also prevents clogging and the waste material screened from the slurry can be discharged into a collecting box 60c for periodic removal.

The cleaned slurry passing through the screening unit 60 discharges into the temporary storage tank 59 within which it is agitated by a device 63 to prevent settling of the solids and from which it can be withdrawn as needed by a pump 64 through a pipe 65 leading to a mixing tank 66 on the output side 30 of the system.

The recovery slurry stored in tank 59 is regularly measured, tested and analyzed to determine (1) the percent of the polishing oxides being used that are being recovered; (2) the amount of solids per gallon in the recovery slurry; and (3) the percentage of polishing oxide in these solids. On the basis of this information the recovery slurry from the tank 59 can be supplemented and reinforced in the mixing tank 66 to condition it to be pumped through the output side 30 of the system and so recirculated for reuse on the polishing line.

In this connection it has been found that while it is feasible to recover and reuse the polishing oxides themselves the additives used with the oxides, such as copperas with rouge or cerous nitrate with cerium oxide, dissipate in the polishing process and are not available for recovery or reuse.

Therefore, while the polishing oxide in the slurry in the tank 59 is both ready and highly suitable for reuse without further treatment, it is necessary to supplement the slurry with whatever additional polishing oxide and/or water is necessary to provide the desired volume of slurry and concentration of polishing oxide and to replace all of the additive.

By way of illustration there is set forth below one specific example of a successful use of the invention in reclaiming and reusing cerium oxide on a standard plate glass polishing line.

EXAMPLE

The following was established as a convenient batch unit of a polishing oxide-water slurry that was known to produce a satisfactory polish on ground plate glass blanks when used on a commercial grinding and polishing line:

|  | Lbs. |
|---|---|
| Water (500 gals.) | 4300 |
| Cerium oxide [1] | 66 |
| Cerous nitrate hexahydrate | 40 |

[1] A commercial mixture of rare earth oxides which contains 44% cerium oxide may be employed as the source of cerium oxide. In that case 150 pounds (66/.44=150) of the source material will be required to provide 66 lbs. of cerium oxide.

A supply of polishing slurry of the above composition was created, from successive batch units made up of new materials in the amounts set forth, and was continuously fed into the polishing oxide distributor section 27 of a conventionally operating grinding and polishing line of the character illustrated and described in this application. At the same time the slurry deposited on the table margins during the polishing operation was collected in a water slurry and screened into tank 59.

Measurements of the slurry in tank 59 were made to determine its specific gravity and samples of it were analyzed for percent solids and for cerium oxide.

From this, and volume measurements, it was determined that there was ½ pound of solids in each gallon of slurry; that 22% of these solids were $CeO_2$; that, therefore, there was approximately .110 pound of $CeO_2$ in each gallon of slurry (.5 lb.×22%=.110) and that approximately 60% of the $CeO_2$ being used could be recovered.

Operation of the line was continued but thereafter the polishing oxide slurry was supplied in batch units containing both used and new cerium oxide on the following basis:

Since each established batch unit required 66 pounds of $CeO_2$; since 60% $CeO_2$ was being recovered; and since each gallon of the recovery slurry contained .110 pound of $CeO_2$; 360 gallons of the recovery slurry would supply the available amount (60%) of used $CeO_2$ for each batch unit (66 lbs.×60%=39.6 lbs. and 39.6/.11=360).

Therefore the batch units were made up by pumping 360 gallons of recovery slurry from tank 59 into mixing tank 66 and adding 140 gallons of water, 26.4 pounds of new $CeO_2$ and 40 pounds of new $Ce(NO_3)_3 \cdot 6H_2O$. These batch units were identical, so far as essential ingredients are concerned, with the established batch unit, thus:

|  | Water (gal.) | $CeO_2$ (lbs.) | $Ce(NO_3)_3 \cdot 6H_2O$ (lbs.) |
|---|---|---|---|
| Slurry | 360 | 39.6 |  |
| Water (new) | 140 |  |  |
| $CeO_2$ (new) |  | 26.4 |  |
| $Ce(NO_3)_3 \cdot 6H_2O$ |  |  | 40 |
|  | 500 | 66.0 | 40 |

Polishing results obtained with this conditioned, reclaimed slurry compared favorably with the results obtained with the original slurry using all new materials and, while different operating conditions and/or different batch units or different slurry compositions would obviously require different calculations, the general principles set forth in the above example can be followed in recovering and conditioning various polishing oxides for reuse.

As stated elsewhere, the purpose of screen unit 60 is to remove unwanted solids (solids generated in the polishing operation) from the recovered material. There are, of course, finer unwanted solids (also generated in the polishing operation) that pass through screen unit 60 and remain in the slurry. At higher levels of concentration in the polishing slurry these finer unwanted particles could have a detrimental effect on polishing efficiency of the slurry. However, it has been found that when the invention is practiced as in the above example the concentration of these finer unwanted particles stabilizes at a low level and there is no detrimental effect.

Therefore, employing the method and apparatus illustrated and described, the mixing tank 66 will always contain a supply of recovered slurry properly conditioned for reuse and after thorough agitation by the unit 67 in this tank 66, a pump 70 in pipe 71 withdraws the conditioned slurry therefrom and directs the same selectively into one or the other of discharge reservoir tanks 72, 73 and 74 through individual pipes 75, 76 and 77 in which are interposed control valves 78, 79 and 80. Each tank 72 to 74 is also equipped with an agitator unit 81, 82 and 83 and slurry may be selectively withdrawn from any one of these tanks through individual pipes 84, 85 or 86 each of which is equipped with a control valve 87, 88 or 89. The adjoining ends of pipes 84, 85 and 86 through conventional fittings are adapted to connect through pipe 90 to a pump 91 and the output side of this pump is connected to the distributor section 27 of the piping system 28. The delivery rate or volume of the slurry being circulated through the distributor section 27 is predeterminedly maintained at sufficient pressure to adequately supply conduits 26 or polishing runners 15 as shown in FIG. 1 and provide a supply of return slurry through return section pipe 29 to the several reservoir tanks 72, 73 and 74. This is made possible by the provision of diverter pipes 100, 101 and 102; each being equipped with a screen device 103 to remove particle contaminants from the solution.

Also through the agitating influence of units 81, 82 and 83 the quality of the polishing solution withdrawn from any of the tanks is esentially constant and the recirculating system assists in insuring that the polishing materials suspended in the polishing slurry are uniformly fed to each polishing runner.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In a method of polishing glass in which a polishing slurry, made up of specified proportions of water, a polishing oxide and an additive as essential ingredients, is fed between a surface of said glass and a polishing tool moving over said surface, said glass being supported on tables during polishing thereof with the spent slurry and other solids that are rubbed from said glass surface forming deposits on the tables, the steps of adding moisture to said deposits, collecting part of said polishing oxide along with said other solids from the deposits thereof in a recovery slurry, conditioning said recovery slurry by adding thereto whichever of said essential ingredients in whatever amount is necessary to make the proportions of water, polishing oxide and additive in said recovery slurry substantially the same as said specified proportions of said essential ingredients in said polishing slurry, and then feeding said conditioned slurry between said glass surface and said polishing tool.

2. A method as defined in claim 1, wherein said deposits are agitated prior to collection thereof.

3. A method as defined in claim 1, in which said polishing tool is faced with hair felt, wherein said recovery slurry is treated to remove hairs therefrom before conditioning the same.

4. A method as defined in claim 1, in which said polishing tool is faced with hair felt, wherein said recovery slurry is treated by passing the same first through a relatively coarse scalping screen and then through a relatively fine screen to remove hairs therefrom before conditioning same.

5. A method as defined in claim 1, in which said glass is in the form of ground plate glass blanks and said polishing is carried out while said tables with the blanks supported thereon are moving along a defined path, wherein said polishing oxide and other solids are collected by suction applied to said deposits along the margins of said tables.

6. In apparatus for polishing ground plate glass blanks while said blanks are supported on tables moving along a defined path beneath a plurality of polishing tools moving over said blanks, a supply line for carrying a water slurry of a polishing oxide, means for feeding said slurry from said supply line between the surfaces of said blanks and said polishing tools, means for moistening deposits of spent slurry and other solids that are rubbed from the surfaces of the glass blanks and formed along the margins of said tables, means for agitating said deposits, suction means for removing said moistened and agitated deposits from the margins of said tables, and means for returning recovered slurry from the deposits so removed to said supply line.

7. Apparatus as defined in claim 6, in which means is interposed in said return means for mixing additional ingredients with the recovered slurry from said deposits before returning the same to said supply line.

8. Apparatus as defined in claim 6, in which said tools are faced with hair felt, and means interposed in said return means for first scalping and then screening the slurry from said deposits to remove hair therefrom.

References Cited

UNITED STATES PATENTS

| | | | |
|---|---|---|---|
| 1,629,502 | 5/1927 | Hitchcock | 51—264 |
| 1,887,554 | 11/1932 | Hitchcock | 51—110 |
| 1,890,343 | 12/1932 | Swartzlander | 51—264 |
| 2,200,592 | 5/1940 | Coddington | 51—270 X |
| 2,486,322 | 10/1949 | Paul | 51—263 X |
| 2,955,031 | 10/1960 | Bliton. | |
| 3,247,626 | 4/1966 | Kunkle | 51—283 |
| 1,740,005 | 12/1929 | Crowley | 51—292 X |
| 3,162,986 | 12/1964 | Olivieri | 51—292 X |

HAROLD D. WHITEHEAD, *Primary Examiner.*